(12) United States Patent
Murota

(10) Patent No.: US 9,709,170 B2
(45) Date of Patent: Jul. 18, 2017

(54) MACHINE TOOL INCLUDING SEALING STRUCTURE IN ROTATION UNIT

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/327,121

(22) Filed: Jul. 9, 2014

(65) Prior Publication Data

US 2015/0014936 A1 Jan. 15, 2015

(30) Foreign Application Priority Data

Jul. 11, 2013 (JP) ................................. 2013-145472

(51) Int. Cl.
| | | |
|---|---|---|
| *F16J 15/00* | (2006.01) | |
| *F16J 15/40* | (2006.01) | |
| *G05B 19/406* | (2006.01) | |
| *G05B 19/4063* | (2006.01) | |

(52) U.S. Cl.
CPC ........... *F16J 15/002* (2013.01); *F16J 15/406* (2013.01); *G05B 19/406* (2013.01); *G05B 19/4063* (2013.01)

(58) Field of Classification Search
CPC F16J 15/40; F16J 15/162; F16J 15/342; F16J 15/406
USPC ........................................ 277/431, 913, 927
See application file for complete search history.

(56) References Cited

U.S. PATENT DOCUMENTS

| | | | | |
|---|---|---|---|---|
| 3,919,854 A | * | 11/1975 | Denis .............................. | 62/611 |
| 3,999,766 A | * | 12/1976 | Barton .......................... | 277/432 |
| 4,029,323 A | * | 6/1977 | Inoue et al. .................. | 277/431 |
| 4,078,809 A | * | 3/1978 | Garrick et al. ............... | 277/304 |
| 4,114,058 A | * | 9/1978 | Albaric .......................... | 310/54 |
| 4,193,603 A | * | 3/1980 | Sood ............................. | 277/304 |
| 4,313,608 A | * | 2/1982 | Scott ............................. | 277/431 |
| 4,341,093 A | * | 7/1982 | Oishi et al. .................... | 62/505 |
| 4,447,063 A | * | 5/1984 | Kotzur et al. ................ | 277/304 |
| 4,497,172 A | * | 2/1985 | Smith .......................... | 60/226.1 |
| 4,502,693 A | * | 3/1985 | Lesiecki et al. ............. | 277/431 |
| 4,606,652 A | * | 8/1986 | Swearingen .................. | 384/130 |

(Continued)

FOREIGN PATENT DOCUMENTS

| | | |
|---|---|---|
| CN | 201027986 Y | 2/2008 |
| CN | 203979414 U | 12/2014 |

(Continued)

OTHER PUBLICATIONS

Office Action mailed Sep. 30, 2014, corresponding to Japanese patent application No. 2013-145472.

(Continued)

*Primary Examiner* — Kristina Fulton
*Assistant Examiner* — Eugene G Byrd
(74) *Attorney, Agent, or Firm* — Hauptman Ham, LLP

(57) ABSTRACT

A machine tool including a sealing structure in a rotation unit includes a gas supply amount control unit configured to control so that an air sealing gas supply amount in the case of a deceleration state of the rotation unit determined by a rotation state determination unit becomes larger than an air sealing gas supply amount in the case of a non-deceleration state determined by the rotation state determination unit.

1 Claim, 2 Drawing Sheets

(56) References Cited

U.S. PATENT DOCUMENTS

| | | | |
|---|---|---|---|
| 4,721,313 A * | 1/1988 | Pennink | 277/412 |
| 4,773,654 A * | 9/1988 | Fritsch | 277/348 |
| 4,984,974 A * | 1/1991 | Naya et al. | 418/87 |
| 5,133,561 A * | 7/1992 | Hattori et al. | 277/646 |
| 5,141,389 A * | 8/1992 | Bear et al. | 415/30 |
| 5,248,022 A * | 9/1993 | Kamikawa et al. | 277/431 |
| 6,345,954 B1 * | 2/2002 | Al-Himyary et al. | 415/112 |
| 8,573,600 B2 * | 11/2013 | Boom et al. | 277/431 |
| 8,739,812 B2 * | 6/2014 | Brandon-Jones et al. | 137/246.11 |
| 2007/0199296 A1 | 8/2007 | Santo | |
| 2015/0014936 A1 | 1/2015 | Murota | |

FOREIGN PATENT DOCUMENTS

| | | |
|---|---|---|
| JP | 58-149655 U | 10/1983 |
| JP | 62-185450 U | 11/1987 |
| JP | 4-90770 U | 8/1992 |
| JP | 5-261603 A | 10/1993 |
| JP | 7-239040 A | 9/1995 |
| JP | 8-22494 B2 | 3/1996 |
| JP | 2521455 Y2 | 12/1996 |
| JP | 10-205626 A | 8/1998 |
| JP | 2007-229856 A | 9/2007 |
| JP | 2008-119808 A | 5/2008 |

OTHER PUBLICATIONS

Office Action in CN Application No. 201410331357.8, dated Sep. 2, 2016.

* cited by examiner

MACHINE TOOL INCLUDING SEALING STRUCTURE IN ROTATION UNIT

RELATED APPLICATIONS

The present application claims priority to Japanese Application Number 2013-145472, filed Jul. 11, 2013, the disclosure of which is hereby incorporated by reference herein in its entirety.

BACKGROUND OF THE INVENTION

1. Field of the Invention

The present invention relates to a machine tool including a sealing structure in a rotation unit.

2. Description of the Related Art

A sealing structure is provided in a rotation unit such as a main shaft of a machine tool in order to prevent the intrusion of an atmosphere including a cutting fluid or mist of the cutting fluid. The sealing structure may be formed as an oil seal or a labyrinth seal.

A rotation body sealing device disclosed in Japanese Utility Model Application Laid-Open (JP-U) No. 58-149655 prevents the intrusion of a cutting fluid or the like by providing a sealing structure in combination of a labyrinth seal and an air seal.

JP-U No. 62-185450 discloses a spindle motor that reinforces a sealing structure by complicating a shape of a labyrinth seal.

JP-U No. 4-90700 discloses an air sealing structure that reinforces a sealing structure by providing a multi-stage foreign matter intrusion prevention unit in addition to the combination of the labyrinth seal and the air seal.

FIG. 2 is a cross-sectional view illustrating the periphery of a rotation unit of a feeding shaft according to the related art. A shaft 1 is held by a bearing 2 and a housing 3. As a sealing structure, a labyrinth seal 4 and an air seal 7 are used together. The labyrinth seal 4 is formed between the shaft 1 and a plate-shaped shielding member 8. The shaft 1 is rotated by a power source such as a motor.

When the rotation unit rotates at a constant speed, the labyrinth seal 4 prevents the intrusion of the atmosphere including the cutting fluid or the mist of the cutting fluid with respect to the sealing structure. When the rotation unit stops, the air seal 7 prevents the intrusion of the atmosphere including the cutting fluid or the mist of the cutting fluid with respect to the sealing structure.

However, when the rotation unit enters a transition state as a deceleration state where a certain constant rotation number reaches a different constant rotation number, the labyrinth seal 4 suctions a gas in the periphery of the seal. At this time, a clean atmosphere supplied as the air seal 7 is first suctioned to the labyrinth seal 4.

Here, in the related art, there is a case where a clean atmosphere supply amount is smaller than an amount of the gas suctioned to the labyrinth seal since the fact that the labyrinth seal 4 suctions the peripheral gas in the transition state as the deceleration state is not known. As a result, since the clean atmosphere supply amount is not enough, the labyrinth seal 4 suctions the atmosphere including the cutting fluid or the mist of the cutting fluid along with the clean atmosphere for sealing air. Accordingly, the cutting fluid or the mist of the cutting fluid intrudes into the power source such as a motor.

FIG. 3 is a cross-sectional view illustrating the periphery of the rotation unit of the feeding shaft in which both an oil seal 5 and the air seal 7 are used as a sealing structure in the related art. The shaft 1 is held by the bearing 2 and the housing 3. In the oil seal 5, when the rotation number increases, the rotation unit and the oil seal are separated from each other, so that the sealing effect is degraded. At this time, the air seal 7 makes up for the sealing effect of the oil seal 5. However, in the case where the current state becomes the transition state where the constant rotation number reaches the different constant rotation number while the rotation unit and the oil seal 5 are separated from each other, there is a concern that the clean atmosphere supply amount is not sufficient due to the air seal 7 when the rotation unit and the oil seal 5 separated from each other return to the original state, and the atmosphere including cutting fluid or the mist of the cutting fluid is suctioned.

In general, the machine tool includes the sealing structure that is provided in the rotation unit so as to prevent the intrusion of the atmosphere including the cutting fluid or the mist of the cutting fluid. However, such a sealing structure is a sealing structure contrived based on the operation in the rotation state or the stop state, and is not contrived in consideration of the transition state from the rotation state to the stop state and the transition state from the stop state to the rotation state.

In fact, there is a case in which the atmosphere including the cutting fluid or the mist of the cutting fluid intrudes into the sealing structure in the rotation transition state as the deceleration state where the rotation unit changes from the rotation state to the stop state. The intruded cutting fluid has a bad influence such as poor lubrication of a bearing, and hence the reliability of the machine tool is degraded. Accordingly, the intrusion of the cutting fluid or the mist of the cutting fluid into the sealing structure may not be prevented only by the sealing structure contrived based on the operation in the rotation state or the stop state.

SUMMARY OF THE INVENTION

In view of this circumstance, an object of the invention is to provide a machine tool adapted to prevent an intrusion of an atmosphere including a cutting fluid or mist of a cutting fluid with respect to a sealing structure in a transition state where a non-changed constant rotation number reaches a changed constant rotation number including 0 when a constant rotation number of a rotation unit changes.

According to the invention, there is provided a machine tool that includes a sealing structure in a rotation unit, the machine tool including: a gas supply unit configured to supply an air sealing gas to the periphery of the rotation unit; a rotation state determination unit configured to determine whether the rotation speed of the rotation unit is in a deceleration state; and a gas supply amount control unit configured to control larger amount of air sealing gas supplied in the case of the deceleration state determined by the rotation state determination unit than an air sealing gas supply amount in the case of a non-deceleration state determined by the rotation state determination unit.

The rotation state determination unit may calculate a rotation number change rate every predetermined time and determine that the current state is the deceleration state when the calculated rotation number change rate exceeds a predetermined reference value.

Since the invention has the above-described configuration, it is possible to provide the machine tool adapted to prevent the intrusion of the atmosphere including the cutting fluid or the mist of the cutting fluid with respect to the sealing structure in the transition state as the deceleration state where the non-changed constant rotation number reaches the changed constant rotation number including 0 when the constant rotation number of the rotation unit changes.

That is, the amount of the air sealing gas supplied to the rotation unit is increased by determining whether the current state is the deceleration state where the non-changed constant rotation number reaches the changed constant rotation number in consideration of the fact that the sealing structure provided in the rotation unit suctions the atmosphere in the periphery of the rotation unit in the deceleration state in which the constant rotation number of the rotation unit changes. A state is formed in which the sealing structure provided in the rotation unit solely suctions the air sealing gas, and the sealing structure does not suction the atmosphere including the cutting fluid or the mist of the cutting fluid. Accordingly, the bad influence of the poor lubrication of the bearing is prevented, and hence the highly reliable machine tool is provided.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
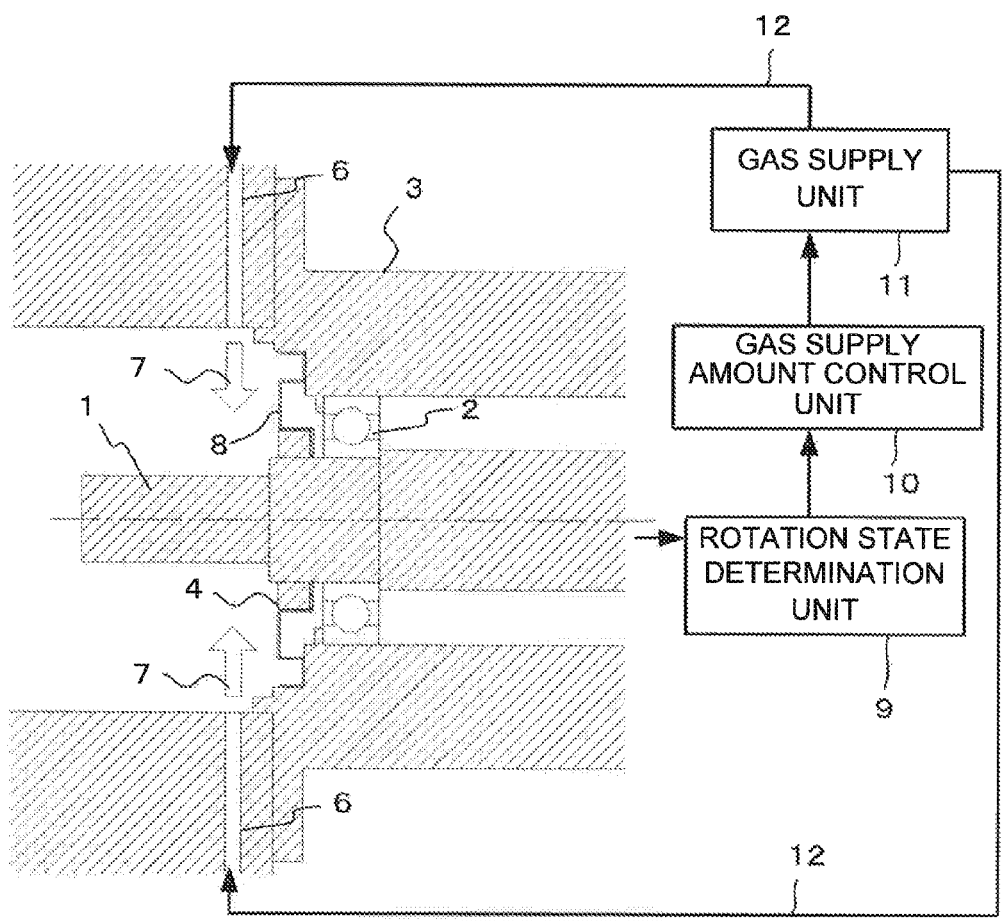
FIG. 1 is a view illustrating a sealing structure for a feeding shaft according to the invention.
Figure 2:
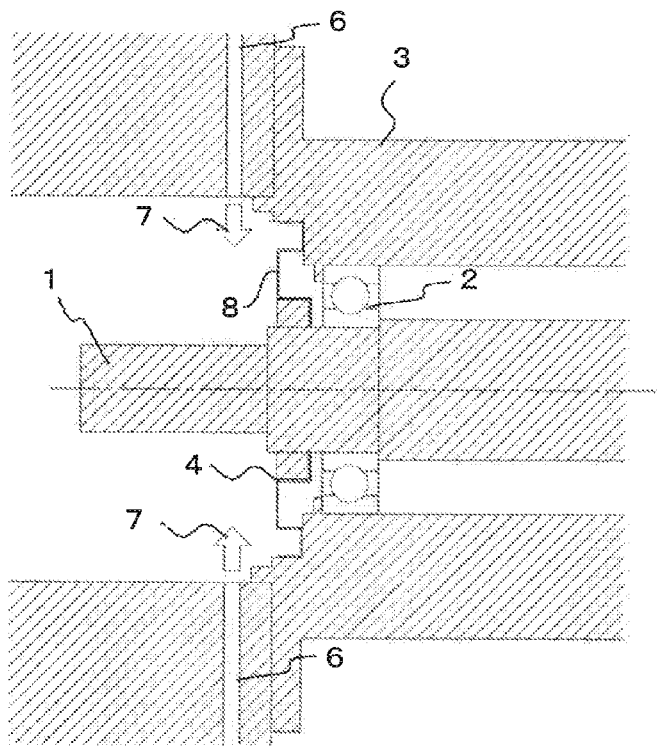
FIG. 2 is a view illustrating a sealing structure of a labyrinth seal and an air seal for a feeding shaft according to the related art.
Figure 3:
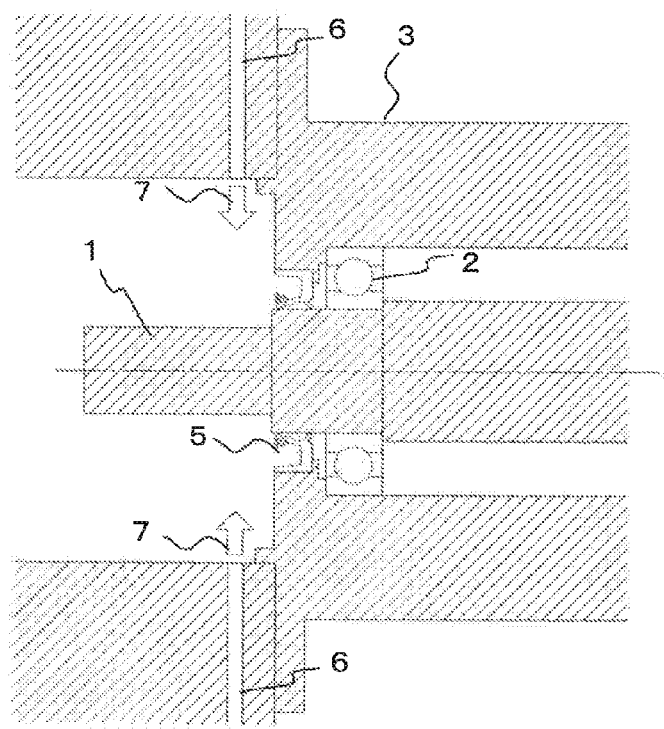
FIG. 3 is a view illustrating a sealing structure of an oil seal and an air seal for a feeding shaft according to the related art.

A machine tool that processes a work includes plural power sources such as motors for generating a rotational driving force used to move a table having the work placed thereon or a main shaft having a tool attached thereto. According to an experiment, it is proved that an atmosphere in the periphery of a rotation unit is suctioned to a sealing structure provided in the rotation unit in a transition state as a deceleration state where a rotation number per unit time of the rotation unit such as a connection unit changes due to a rotational driving force transmitted from a power source or a rotation unit of a power source.

Even when a clean gas for sealing air is supplied to the periphery of the rotation unit, there is a case where the clean gas supply amount determined based on a constant-speed rotation state (including a stop state) in which the rotation unit rotates at a constant rotation number is not enough for the amount of the clean gas to be suctioned to the sealing structure provided in the rotation unit. At this time, an atmosphere including a cutting fluid or mist of a cutting fluid is suctioned to the sealing structure provided in the rotation unit along with the clean gas for sealing air.

Here, when it is determined that the current state is the transition state as the deceleration state by determining whether the current state is the transition state as the deceleration state where a certain constant rotation number changes to a different low constant rotation number, the clean gas supply amount supplied to the periphery of the rotation unit is increased so as to supply a sufficient amount of the clean gas as the amount of the atmosphere to be suctioned to the sealing structure provided in the rotation unit. Since the sufficient amount of the clean gas is supplied as the amount suctioned to the sealing structure provided in the rotation unit, the intrusion of the atmosphere including the cutting fluid or the mist of the cutting fluid to the sealing structure provided in the rotation unit is prevented.

When it is determined that the current state is the transition state as the deceleration state by determining that the current state is the transition state as the deceleration state where the pre-change constant rotation number changes to the post-change constant rotation number in the case where the rotation number of the rotation unit changes from a high speed to a low speed, the amount of the clean gas for sealing air supplied to the periphery of the rotation unit is increased so that the atmosphere including the cutting fluid or the mist of the cutting fluid is not suctioned to the sealing structure. Accordingly, since the intrusion of the mist of the cutting fluid may be prevented, a machine tool capable of suppressing a bad influence such as poor lubrication of a bearing as much as possible is realized.

Hereinafter, an embodiment of the invention will be described by exemplifying a feeding shaft with reference to the drawings. In addition, a description will be made by giving the same reference numerals to the same components as those of the related art. A shaft 1 is held by a bearing 2 and a housing 3. As the sealing structure, a labyrinth seal 4 is employed, and a gas supply port 6 is provided so as to supply the clean gas for sealing air to the periphery of the rotation unit. The labyrinth seal 4 is formed between the shaft 1 and a plate-shaped shielding member 8.

A rotation state determination unit 9 receives a rotation detection signal from a rotation detector (not illustrated) detecting the rotation number of the shaft 1, that is, the rotation unit. The rotation state determination unit 9 determines whether the rotation number of the rotation unit is in the transition state as the deceleration state where the rotation number changes to a normal rotation number in a different low-speed rotation state. The rotation state determination unit 9 transmits a determination result of the rotation state of the shaft 1, that is, the rotation unit to a gas supply amount control unit 10. The gas supply amount control unit 10 may adjust the clean air supply amount as the air seal amount to be supplied to the gas supply port 6 through a pipe 12 by the instruction with respect to a gas supply unit 11.

When the rotation state determination unit 9 determines that the rotation of the rotation unit is in the deceleration state, the rotation state determination unit 9 send a signal that notifies the gas supply amount control unit 10 that the rotation of the rotation unit is in the deceleration state. The gas supply amount control unit 10 controls the gas supply unit so that the supply of the air sealing air per unit time increases in accordance with the determination result of the rotation state determination unit 9. Accordingly, the supply amount of the clean gas for sealing air per unit time may be increased.

The shaft 1 is rotated by a power source such as a motor. The intrusion of the atmosphere including the cutting fluid or the mist of the cutting fluid into the power source is prevented by the labyrinth seal 4 while the rotation unit rotates at a constant speed or an acceleration speed. The intrusion of the atmosphere including the cutting fluid or the mist of the cutting fluid is prevented by the clean gas for sealing air to be supplied from the gas supply port 6 while the rotation unit is stopped.

When the rotation number per unit time of the rotation unit changes, it is determined whether the current state is the transition state as the deceleration state where the non-changed constant rotation number reaches the changed constant rotation number, and the amount of the clean gas for sealing air to be supplied from the gas supply port 6 is set so that the air sealing clean gas supply amount in the transition state as the deceleration state becomes larger than the gas supply amount in the rotation state of the non-changed constant rotation number regardless of the clean gas supply amount (which may be 0) in the rotation state of the non-changed constant rotation number or the clean gas supply amount (which may be 0) in the rotation state of the changed constant rotation number. Since the air sealing clean gas supply amount in the transition state as the deceleration state is set to be larger than the air sealing clean gas supply amount in the rotation state of the changed constant rotation number, the clean gas for sealing air is supplied by a sufficient amount as the amount of the atmosphere to be suctioned to the sealing structure of the labyrinth seal 4.

It is important to increase the clean gas supply amount in the transition state as the deceleration state, thereby a sufficient effect is exhibited. It is more effective when the clean gas supply amount in the transition state as the deceleration state is larger than the amount of the atmosphere to be suctioned to the sealing structure in the transition state as the deceleration state.

As a result, the intrusion of the atmosphere including the cutting fluid or the mist of the cutting fluid with respect to the sealing structure is prevented.

In addition, the rotation state determination unit 9 may determine that the current state is not the transition state as the deceleration state but the constant-speed rotation state when the rotation number changes by a small amount, for example, from 10000 per min to 9999 per min. That is, for example, a configuration may be employed in which a reference value used to determine that the current state is the transition state as the deceleration state at a rotation number change amount (in the above-described example, 1 per min) or a rotation number change rate (in the above-described example, 0.1%) and the transition state as the deceleration state is determined when the rotation number change amount or the rotation number change rate exceeds the reference value.

Further, the labyrinth seal 4 has been exemplified as the sealing structure provided in the rotation unit for description, but the invention is not limited to the labyrinth seal 4. Furthermore, air or nitrogen gas may be supplied as a gas to be supplied.

In addition, regarding the applicable scope of the invention, the invention may be applied to the machine tool that includes the sealing structure in the rotation unit, but may be applied to the configuration in which the air sealing air is suctioned when the rotation number is in the deceleration state. It is possible to easily check whether the air sealing air is suctioned in the deceleration state through an experiment by the person skilled in the art having general knowledge.

The invention claimed is:

1. A machine tool that includes a sealing structure in a rotation unit, the machine tool comprising:
    a gas supply unit configured to supply and discharge an air sealing gas to the periphery of the rotation unit;
    a rotation state determination unit configured to determine whether the rotation speed of the rotation unit is in a deceleration state; and
    a gas supply amount control unit configured to control an air sealing gas supply amount when the deceleration state determined by the rotation state determination unit larger than an air sealing gas supply amount when a non-deceleration state determined by the rotation state determination unit,
    wherein the rotation state determination unit is configured to
        calculate a rotation number change rate of a number of rotations per unit of time of the rotation unit, and
        determine that a current state is the deceleration state when the calculated rotation number change rate exceeds a predetermined reference value.

* * * * *